June 17, 1941.  J. W. OWENS  2,245,810
FABRICATED ENGINE FRAME STRUCTURE
Filed Aug. 28, 1939   3 Sheets-Sheet 3
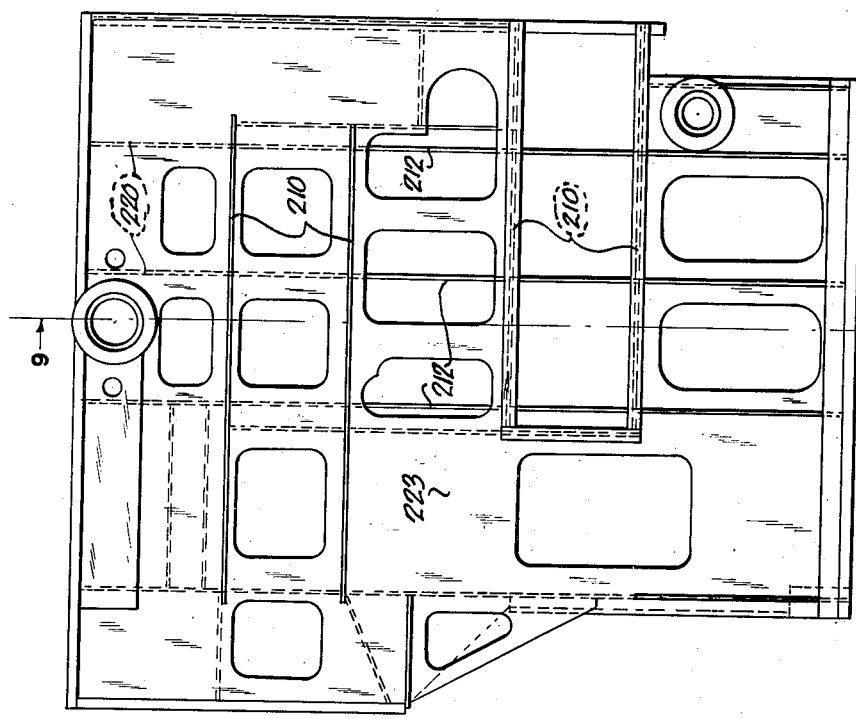
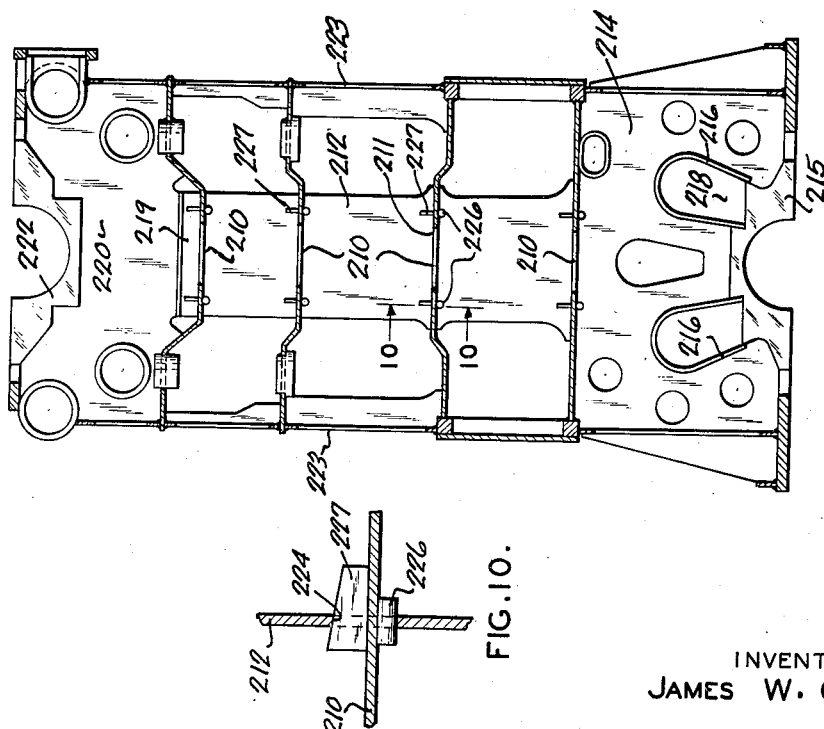
INVENTOR
JAMES W. OWENS
BY Paul L. Keohu
ATTORNEY Patented June 17, 1941

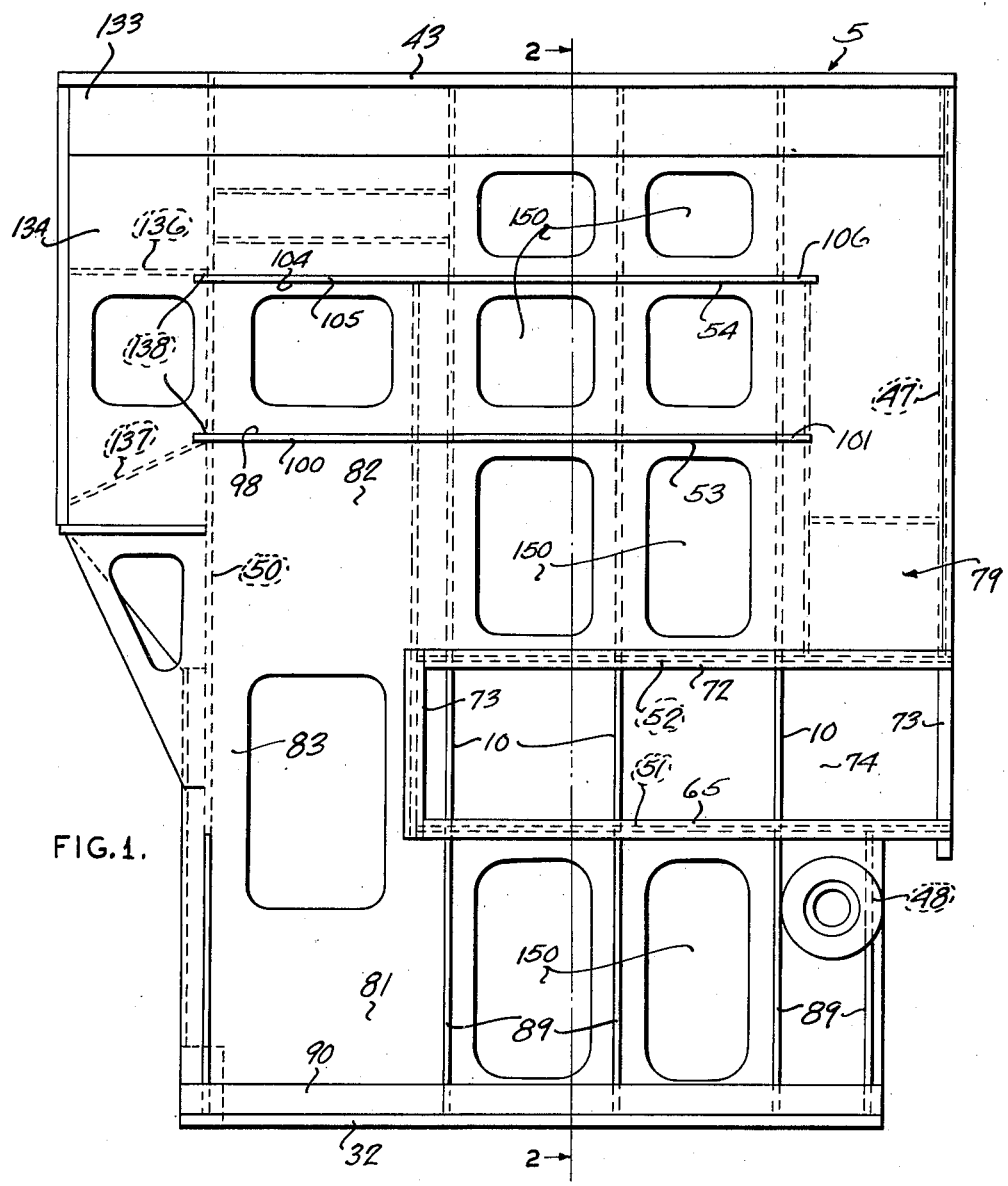

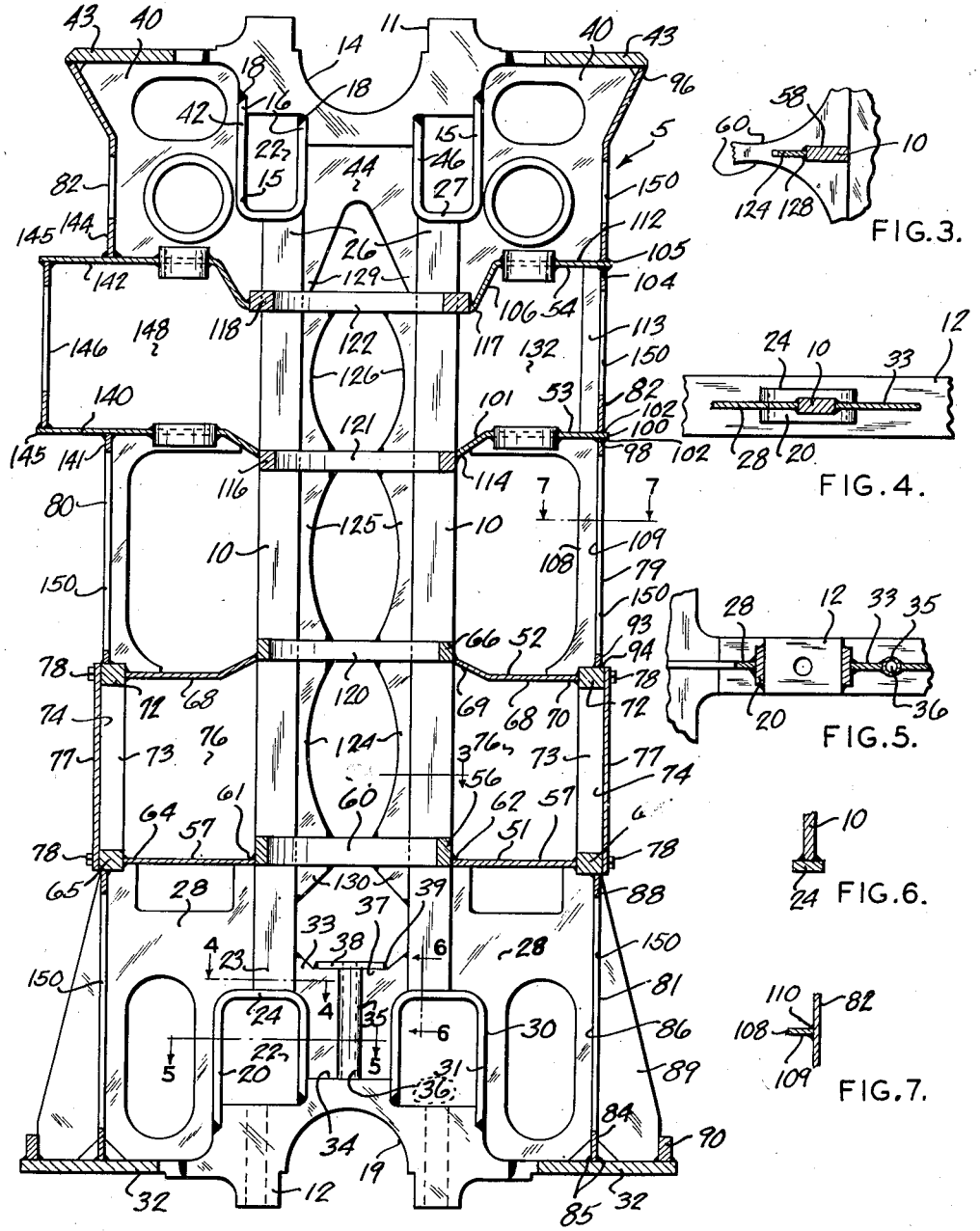

2,245,810

UNITED STATES PATENT OFFICE 2,245,810

FABRICATED ENGINE FRAME STRUCTURE

James W. Owens, Beloit, Wis., assignor to Fairbanks, Morse & Co., Chicago, Ill., a corporation of Illinois Application August 28, 1939, Serial No. 292,230

9 Claims. (Cl. 123—195)

This invention relates to fabricated engine frame structures for internal combustion engines of single or multi-cylinder type, and more particularly to improvements in the structure and method of assembly of built-up cylinder blocks for engines of the Diesel, opposed piston type characterized by upper and lower crankshafts.

The present application is a continuation in part of a co-pending application by Hans Davids and James W. Owens, for Engine frame construction, filed August 28, 1939, bearing Serial No. 292,231 and assigned to Fairbanks, Morse & Co.

The principal object of the invention is to provide a greatly improved and simplified engine cylinder block fabricated from relatively few parts, including flat metallic plates and parts of special shapes, the parts being adapted for ready and easy assembly, and further adapted to be secured together, as by welding, with greater facility than has been the case heretofore.

Another object is attained in the provision of an improved, fabricated engine block, the structure of which includes interrelated main horizontal and vertical frame elements each of which is of a length to extend throughout at least the major part of the corresponding dimension of the completed block in the plane of the element, thus providing for a uniform and continuous transmission of the principal stresses substantially throughout the longitudinal, transverse and vertical extent of the engine frame, thereby avoiding transmission of such stresses through a multiplicity of structural joints.

A further object is attained in the provision in a fabricated engine block of the type described, of a plurality of vertically arranged, horizontally spaced frame elements, each of a length corresponding at least in greater part, to the vertical dimension of the engine block, and upper and lower crankshaft bearing elements structurally united with the upper and lower crankshaft bearing elements structurally united with the upper and lower ends respectively, of said frame elements, whereby the main stresses occurring in the vertical direction between the upper and lower crankshafts, may be transmitted through these elements without materially stressing any of the horizontally arranged frame elements.

Among other objects and advantages attained by the present invention, may be noted the provision of a fabricated engine block comprised of but few frame elements adapted for assembly in a manner to provide a rigid frame structure, the extent and assembly relation of the elements being such as to require but a minimum number of welded joints in effecting assembly of the block, thus avoiding transmission of main stresses through a multiplicity of welded joints, such as obtains in heretofore prevailing fabricated types of engine frames, and the provision of an improved engine block fabricated from relatively few frame members, in which the principal stress members are relatively so adapted for assembly prior to welding of the several frame joints, as to obviate the need for assembly jigs and the like which have been necessary heretofore, to hold the frame elements in predetermined assembly relation during the welding process. More particularly, the main elements of the frame are adapted for initial assembly prior to welding, in an interlocking member, whereby there is greatly facilitated the proper alignment of the parts prior to welding.

Further objects and advantages will readily appear from the following description when read in connection with the accompanying drawings, in which:

Fig. 1 is a side elevation of a preferred form of multi-cylinder engine block or frame structure constructed according to the present invention; Fig. 2 is a somewhat enlarged vertical section, taken transversely through the multi-cylinder engine block structure, as viewed from line 2—2 in Fig. 1; Figs. 3 through 7 are fragmentary sectional elevations of portions of the frame structure, illustrating constructional details thereof, the several views being taken respectively, along lines 3—3, 4—4, 5—5, 6—6, and 7—7 in Fig. 2; Fig. 8 illustrates in side elevation, a modified form of multi-cylinder engine block structure; Fig. 9 is a vertical section transversely of the frame thereof, as taken from line 9—9 in Fig. 8, and Fig. 10 is an enlarged fragmentary section of the frame structure illustrating certain details of frame assembly, the view being taken from line 10—10 in Fig. 9.

Referring to the drawings by suitable characters of reference, Figs. 1 through 7 illustrate the constructional details and assembly relation of frame elements comprising in assembly, a preferred form of fabricated cylinder block 5 for a multi-cylinder engine. In the present example, the frame is adapted for a Diesel engine of opposed-piston type, characterized by upper and lower crankshafts, although it is to be understood that a frame structure constructed according to this invention, is applicable generally, as by appropriate modifications in the shape and assembly relation of the frame parts to accommodate the structural characteristics of the particular type of engine, to engines of fuel oil, gas or gasoline operated types.

Referring particularly to Fig. 2, the frame includes a plurality of laterally spaced, paired bars 10 extending vertically of the frame. A pair of these bars is disposed between adjacent cylinders (not shown) of the engine and at each end of the cylinder bank, so that the number of paired bars will exceed by one, the number of cylinders in the engine. The illustration of Fig. 2 is a vertical sectional elevation taken transversely of the frame at the zone of one pair of bars 10, and since the frame sections at the other pairs of bars 10 in a multi-cylinder engine are substantially alike, a full description of the section of Fig. 2 will apply equally to the others. The bars 10 extend continuously in a vertical direction, between upper and lower crank-shaft bearing structures indicated respectively, at 11 and 12. The upper bearing includes a bearing saddle 14 of the preferred configuration shown, and plate elements 15, each bent into the form of a U. The end portions 16 of the U plate legs are welded to stepped-portions of the bearing saddle in the manner shown at 18. The lower bearing likewise includes a bearing saddle 19 and U shaped plates 20 secured thereto in a similar manner. In each case the U plates provide recesses 22 to facilitate assembly of bearing studs or bolts (not shown) which serve to secure the companion bearing saddle elements (not shown) to the bearing saddles 14 and 19.

The lower ends 23 of the bars 10 are preferably butt-welded to the bridge portions 24 of the lower U shaped plates 20 (Fig. 6), while their upper ends 26 are similarly butt-welded to the corresponding bridge portions 27 of the upper U plates. At the lower end of the frame and extending laterally thereof on each side of the bearing saddle assembly, is a plate element 28 the inner vertically extending edge 30 of which is shaped as shown, to engage the bearing saddle 19, the outer leg 31 and a part of the bridge 24 of the adjacent U plate 20, and the lower end 23 of the adjacent one of the paired bars 10. The edge 30 of the plate element is welded to the described frame portions preferably by a continuous weld. Butt-welded to the bearing saddle 19 and to the lower ends of the side plates 28 are foot plates 32 each extending longitudinally throughout the length of the frame (Figs. 1 and 2), these plates serving as frame mounting elements for seating the frame upon its foundation (not shown).

Between the U plates 20 and the lower ends 23 of the bars 10 is a spacer plate 33 (Figs. 2 and 5) which is welded to these elements. The bottom edge 34 thereof abuts the bearing saddle 19 and is welded thereto in assembly. The central vertical portion of the plate 33 is enlarged or bossed as shown at 35, through which extends a lubricating oil passage 36 (Fig. 5), the lower end of which communicates with channels (not shown) in the bearing assembly 19. At the top edge 37 of the plate is a horizontal flange 38 preferably welded to the plate edge as indicated at 39. The flange 38 serves as a mounting expedient for one end of an oil conduit (not shown) provided for delivering lubricating oil from a source of supply thereof, to the passage 36 in plate 33.

In a similar manner, laterally directed plates 40 are arranged on either side of the upper bearing saddle 14, each in edgewise engagement with a portion of the bearing saddle, the outer leg 42 and a portion of the bridge 27 of the adjacent U plate 15, and the end 26 of the adjacent bar 10, the plate being welded to such frame portions in the assembly thereof. Further, butt-welded to the bearing saddle 14 and welded to the upper horizontal edge of each plate 40 is a top plate 43 which extends horizontally and longitudinally of the frame. Moreover, a spacer plate 44 is arranged between the ends 26 of the bars 10, in edge-abutting engagement therewith and with the inner legs 46 of the U plates 15 and the bearing saddle 14, this plate being welded to the said elements in final assembly.

From the foregoing description of the frame structure, it will be noted that the vertical bars 10, upper and lower U plates 15 and 20 respectively, and the upper and lower sets of laterally directed strengthening plates 28—33 and 40—44 respectively, cooperate in final assembly to absorb the major part of the stress load occurring in the vertical direction, the remainder of such load being carried by the side plate assembly of the frame hereinafter to be described, and by suitable transverse frame end plates. In respect to the end plates, these are indicated in dotted lines in Fig. 1, as the end plates 47 and 48 appearing at the right of Fig. 1, and the end plate 50 at the left thereof, the plate 50 being shown as extending vertically substantially through the height of the frame.

Referring now to the several horizontal deck assemblies indicated generally by the numerals 51, 52, 53 and 54, the lowermost deck 51 is comprised of a central deck plate 56 spanning the bars 10, and opposite side deck plates 57. These deck elements are substantially coextensive in length and extend longitudinally of the frame over the cylinder bank and to the end plate 47 (Fig. 1). The opposite longitudinal edges of the center plate 56 are suitably slotted to receive the vertical bars 10, as indicated at 58 in Fig. 3, while the plate is further apertured centrally thereof, as at 60, to receive cylinder liners (not shown). Each of the side deck elements 57 engages the upper edge of the adjacent strengthening plate 28 and may be welded thereto in assembly, while the inner longitudinal edge 61 of each abuts the corresponding adjacent edge of the deck plate 56 and is welded thereto in assembly, as indicated at 62. Engaging the outer longitudinal edge 64 of each side deck element, as well as each of the adjacent plates 28, is a frame bar 65 which is welded to the deck and plates 28 in assembly.

The deck assembly 52 next above deck 51 is substantially the same in structure, comprising a central deck element 66 engaging and secured to the bars 10 in the manner provided for the lower deck element 56, and opposite side deck plates 68 each having its inner longitudinal edge 69 butt-welded to the center plate 66. Welded to the outer edge 70 of each plate 68 is a frame bar 72 similar in form and extent to the bar 65. The corresponding ends of bars 65 and 72 are structurally joined by vertical bars 73 (Figs. 1 and 2), which provide, through bars 72, vertical supports for the deck plates 68. It will be observed now that the bars 65 and 72 provide for a continuous side opening 74 longitudinally of the cylinder bank (Fig. 1) on each side of the frame, giving unobstructed access to the space 76 between the deck elements 57 and 68. The frame zone between the decks 51 and 52 constitutes the exhaust zone of the engine, and in engine assembly, suitable exhaust conduits (not shown) are disposed within the spaces 76. It is preferred to provide unitary conduits each common to all the cylinders, so that by providing the continuous frame opening 74 on each side, such conduits may be readily inserted or removed therethrough as a unit. Normally, and particularly during engine operation, each opening 74 is covered by a side plate 77 secured to the bars 65 and 72 as by assembly bolts 78. The cover plates 77 form a part of the frame side assemblies later to be described, and serve therewith as engine frame stress-carrying elements.

The upper deck assemblies 53 and 54, each of which is substantially like decks 51 and 52 above described, will be described hereinafter in connection with the description of the frame side assemblies.

The frame structure includes opposite side plate assemblies indicated generally at 79 and 80. In order, however, to illustrate an alternate structure for a portion of the side assemblies, the upper portion of the side assembly 80 differs in respects hereinafter appearing from the side assembly 79. It is to be understood that for a given frame, both sides will be the same in form, either of the form shown by the side assembly 79 or of the form of side assembly 80. Accordingly, describing first the side assembly 79 which is that illustrated in elevation in Fig. 1, it may be comprised of a plurality of plate elements, or a single plate as preferred in the present example, which extends longitudinally and vertically of the frame. A part of the plate is cut-away to provide for the frame opening 74 as appears in Fig. 1, so that the plate may be defined as comprising a lower section 81, upper section 82 and a connecting section 83 at the left of the plate (Fig. 1). The lower section 81 has its bottom edge 84 welded to the foot plate 32, as at 85 (Fig. 2), and along its vertical extent is welded to the outer vertical edges 86 of the strengthening plates 28. The upper horizontal edge 88 of the side plate section is welded to the frame bar 65, as shown. A plurality of triangular buttress plates 89 laterally strengthen the side plate section, each being welded to the plate section, the foot plate 32 and to a horizontal foot-bar 90 extending longitudinally of the frame and welded to the foot plate 32.

The upper section 82 of the side plate has its lower edge 93 welded to the bar 72, as at 94 (Fig. 2) and its upper edge 96 welded to the top plate 40. Also, the upper section of the side plate is welded to the several lateral plates 40 engaged thereby. A horizontal, longitudinally extending slot 98 is formed in the upper section 82, through which projects the outer end 100 of a plate 101 forming a side deck element of the deck assembly 53. When seated in the side plate slot, the deck end 100 is welded to the side plate, as indicated at 102 (Fig. 2). Above slot 98 is a like slot 104 provided to receive the end 105 of deck plate 106 forming a part of the uppermost deck assembly 54, the deck end being similarly secured in the side plate slot. As appears in Fig. 1, both deck plates 101 and 106 extend longitudinally of the frame throughout the cylinder bank and to the frame end plate 50. Frame strengthening ribs 108 each of substantially inverted L-shape, extend between and engage the deck plates 68 and 101 (Fig. 2) of the respective deck assemblies 52 and 53, each being welded to the deck plates in assembly. Also, the outer vertical edge 109 of each rib 108 engages the side wall section 82 and is welded thereto as indicated at 110 in Fig. 7.

The upper deck plate 106 is welded to the lower edges 112 of the several lateral plates 40 (Fig. 2), and between the decks 106 and 101 are strengthening ribs 113 welded to the decks and to the side plate section 82. The inner longitudinal edge 114 of deck plate 101 is butt-welded to a central deck plate 116, the latter engaging the bars 10 in the manner described for the lower corresponding deck elements 56 and 66, and being welded thereto in assembly. Similarly, the inner edge 117 of deck plate 106 engages and is welded to a center deck plate 118. Like the lowermost central deck plate 56, the upper decks 66, 116 and 118 are apertured, as at 120, 121 and 122 respectively, to accommodate cylinder liners (not shown). Further, there may be provided suitable spacing members between the central deck plates, as the members 124 between deck elements 56 and 66, the members 125 between deck elements 66 and 116 and members 126 between deck elements 116 and 118 (Fig. 2), each being welded to the deck elements engaged thereby, and to the adjacent bar 10, as indicated at 128 in Fig. 3. As appears in Fig. 2, the uppermost center deck element 118 engages the lower end 129 of spacer plate 44, to which it is welded in assembly. Also, assisting in the structural support of the lowermost center deck 56 are substantially triangular plates or brackets 130 welded to the deck and to the adjacent bars 10.

The side assembly 79 and several side deck assemblies as above described in connection with the disclosure thereof on the right side of Fig. 2 and as viewed in side elevation in Fig. 1, are substantially duplicated on the opposite side of the frame for a given engine frame structure, whereby to provide a frame which will be substantially symmetrical about a vertical plane extending longitudinally thereof, through the cylinder axes. It is to be noted here that the deck assemblies 53 and 54 which extend laterally throughout the frame width and longitudinally throughout the cylinder bank to the frame end plate 50 (Fig. 1), cooperate with the side plate sections 82 to form a passage 132, constituting a scavenging air conduit for the delivery of scavenging air to the air ports of the several cylinders (not shown). Air for combustion and scavenging purposes, is supplied to the conduit by a suitable blower (not shown) which may be secured to the left end of the frame as viewed in Fig. 1, as to an overhanging frame portion 133 provided for this purpose. The upper sections 82 of the side assemblies 79 are projected as at 134, to enclose the overhanging frame portion 133, and cooperating therewith in the extension of the passage 132 to the blower, are plate elements 136 and 137 extending laterally of the frame, and connected to the ends 138 of the deck assemblies 53 and 54. The required volumetric capacity of the air conduit for a given engine, normally may be determined within limits principally by the vertical spacing of the deck assemblies 53 and 54. But in the event it is desired to provide a conduit having a volumetric capacity greater than can be obtained within the confines of the frame side walls, such conduit may be projected laterally outwardly of the frame sides, as exemplified on the left side of the frame section shown in Fig. 2. The modification of the frame structure to attain this end will be now described.

Referring to Fig. 2, the frame side wall assembly 80 on the left side of the figure, is in all major respects, similar to the hereinbefore described side assembly 79, so that the corresponding similar parts thereof may bear the same reference numerals. The upper section 82 of side 80 instead of being slotted to receive the ends of side deck plates 101 and 106 as described for the side 79, is cut-away to provide an aperture extending longitudinally of the side section. The side deck plate 140 of deck assembly 53 is of greater lateral extent than side deck 101, so that it projects through the aperture in side section 82, and laterally outwardly thereof to a predetermined desired extent. The side deck 140 engages the lower longitudinal edge 141 of plate section 82 and is welded thereto in assembly. Similarly, the side deck plate 142 of deck assembly 54 projects laterally through the side plate aperture a like distance, the deck plate engaging and being welded to the longitudinal marginal edge 144 of the side plate section at the plate aperture. Extending vertically between and welded to the corresponding outer ends 145 of decks 140 and 142, is a side plate section 146. Thus the side wall 146 and the decks 140 and 142 cooperate to form a chamber 148, and although not shown, it is to be understood that the opposite ends of the chamber extension laterally beyond the side wall section 82, are closed by suitable transverse wall elements, so that the chamber 148 will be completely enclosed by the frame.

It is to be noted that the side plate assemblies 79 and 80 are suitably apertured, as at 150, to provide access to the interior of the frame, and that normally these apertures or hand-holes will be closed by suitable cover plates (not shown). Also as appears in Fig. 2, each of the central deck elements 56, 66, 116 and 118 is of considerably thicker section than any of the side deck elements, whereby to provide for increased strengthening of these elements at the zone of the cylinders. Although readily understood, it may be noted that between adjacent pairs of the bars 10, the corresponding cylinder-receiving openings in the several central decks 56, 66, 116 and 118 are in vertical register.

Figs. 8, 9 and 10 illustrate a modified form of improved engine frame constructed according to the present invention. The structure shown in transverse section in Fig. 9 is somewhat similar to that illustrated in the sectional view of Fig. 2, so that it will be sufficient for purposes of present disclosure, to point out the major differences only, all other details of structure and assembly corresponding substantially, to the structure described in connection with the frame of Figs. 1 and 2.

As before, vertically spaced decks 210 are provided, each however being a single plate element of the form shown, and of a lateral extent corresponding to the width of the frame. Vertically registering slots 211 are provided in the deck plates to receive relatively wide, vertically extending central plates 212 each having a laterally extending plate 214 preferably integrally united with the lower end thereof, such plate corresponding in lateral extent, substantially to the width of the frame. Welded to the lower plate 214 is a bearing saddle 215 and U shaped plates 216 providing recesses 218 for facilitating bearing assembly, as before described in connection with the structure of Fig. 2. The upper end 219 of each of the central vertical plates 212 is welded to a vertically directed plate 220 which in lateral extent, is substantially equivalent to that of the lower plate 214. The plate 220 is endwise formed to receive an upper bearing saddle 222, the saddle element being welded to the plate in assembly. Each of the side plate assemblies 223 corresponds in structure and arrangements, substantially to the side plate assembly 79 as hereinbefore described for the frame of Figs. 1 and 2. It is to be understood, of course, that side plate assemblies modified as described for the side assembly 80 of Fig. 2, may be employed in the frame structure of Figs. 8 and 9.

In forming the plate 212, suitable slots 224 are provided therein to facilitate assembly positionment of the deck plates 210 relative thereto, prior to the welding operation. In such initial assembly, each deck is retained in proper position by pegs 226 and wedges 227 seated in the slots 224, as shown in Fig. 10, the peg in each case preferably being disposed below the deck plate and the wedge thereabove. In final assembly, the protruding portions of the pegs and wedges may be removed, as by flame cutting or shearing operations, or in and other suitable manner.

From the foregoing description of the several embodiments of the invention, it will be observed that in each case, a greatly improved engine frame structure is provided. In each instance, the frame is comprised of relatively few elements which are structurally related and united to attain a strong and rigid assembly, wherein the stresses occurring in the vertical, horizontal and lateral directions are absorbed by substantially unitary, horizontally and vertically disposed frame elements related in an interlocked manner. The structural features of the frame are such as to facilitate ready and accurate assembly of the parts, and to facilitate welding of the parts together in a manner to prevent material warping or misalignment thereof. It is to be noted in connection with the foregoing, that the designation of the main frame members as horizontal and vertical members, employed throughout the description, conforms to the present exemplary disclosures of vertical opposed piston engine frames. But it will be readily appreciated that such terms indicate within the full scope of the invention, an arrangement wherein one set of frame members bears a substantially right-angle relation to another set of members.

In the final assembly of the frame in the case of each embodiment herein described, those portions thereof which are required to be machine-finished for proper assembly thereto of the working parts of the engine organization, are machined in any suitable manner. Also, the assembled frame is treated in a suitable manner, to equalize the stresses therein, whereby to relieve points or zones of undesirably high stress in the frame.

It is to be understood that the foregoing description and accompanying drawings relate only to preferred forms of the engine frame structure, and that alterations in the parts and assembly relation thereof may be made without departing from the scope of the invention, as defined by the appended claims.

I claim:

1. In a fabricated frame structure for a multi-cylinder engine, a set of spaced frame members extending vertically substantially throughout the major portion of the vertical extent of the frame, laterally directed, vertical plate means in metallically united engagement with the upper ends of said frame members, said plate means being endwise formed to engage engine shaft bearing elements, engine shaft bearing elements structurally united with the lower ends of said frame members, a set of deck-forming frame members each continuous in a direction endwise of the engine, through the cylinder-containing portion of the frame, one of said sets of frame members being adapted for the reception of portions of the other set of frame members in close interfitting and metallically united engagement, deck forming members further being provided with cylinder-receiving openings, and side closure plates metallically united to said deck forming members and said plate means.

2. In a fabricated cylinder block and frame for internal combustion engines of the type described, horizontally spaced frame elements extending vertically substantially throughout the major portion of the vertical extent of the block, vertically spaced deck plate assemblies extending longitudinally and laterally of the block throughout the cylinder-containing portion thereof, and having cylinder-receiving openings, said deck plate assemblies being adapted for receiving portions of said vertical frame elements in close interfitting engagement, vertical spacer bars between the deck plate assemblies, and side plates extending longitudinally throughout the length of the block, said side plates being slotted longitudinally thereof, to receive the outer longitudinal edges of certain of said deck plates, all of said parts being united to thereby form a unitary cylinder block and frame.

3. In a fabricated cylinder block and frame for multi-cylinder internal combustion engines, horizontally spaced frame members extending vertically and substantially throughout the major part of the vertical extent of the cylinder block, a plurality of vertically spaced deck plate assemblies extending longitudinally and laterally of the cylinder block substantially throughout the length and breadth thereof in the zone of the cylinder-containing portion of the block, and having openings for receiving cylinders therethrough, said deck assemblies being slotted to receive said vertical frame members in a manner to provide a structurally interlocked assembly relation thereof, laterally directed, vertical plate means engaging the upper ends of said frame members and being endwise formed to engage engine shaft bearing elements, shaft bearing elements structurally united with the lower ends of said frame members, side plates extending longitudinally of the block throughout the length thereof, and base plates extending longitudinally throughout the length of the block, all of said parts being united to thereby form a unitary cylinder block and frame.

4. In a fabricated frame for multi-cylinder opposed piston internal combustion engines, horizontally spaced vertical frame members each formed to provide a base portion extending laterally substantially throughout the width of the frame, and a stress bar in the central zone of the frame, extending vertically substantially over the cylinder-containing portion of the frame, laterally directed, vertical plate means engaging the upper ends of said stress bars, said plate means being endwise formed to engage engine shaft bearings, engine shaft bearings structurally united with the base portions of said frame members, a plurality of vertically spaced deck plate assemblies each continuous longitudinally and laterally of the frame substantially throughout the length and breadth thereof in the zone of the cylinder-containing portion of the frame, and having openings for receiving cylinders therethrough, said deck assemblies being slotted to receive said vertical stress bars in a manner to provide a structurally interlocked assembly relation thereof, spacer elements extending vertically between said deck plate assemblies, side plates extending longitudinally of the frame throughout the length thereof, and base plates extending longitudinally throughout the length of the frame, all of said parts being united to thereby form a unitary engine frame.

5. In a fabricated cylinder block and frame for an internal combustion engine, of opposed piston type characterized by upper and lower crankshafts, a plurality of pairs of laterally spaced frame elements extending vertically of the cylinder block, upper and lower crankshaft bearing assemblies engaging respectively, the upper and lower ends of each pair of said frame elements, laterally extending frame plates engaging opposite sides of the lower bearing assembly and adjacent ends of said frame elements, laterally extending plates similarly disposed at the upper bearing assembly and upper ends of the said frame elements, a plurality of vertically spaced deck plate assemblies extending laterally and longitudinally of the cylinder block and having openings therein to receive cylinders therethrough, said deck plate assemblies each being slotted to receive said vertical frame elements in structurally interlocked relation therewith, and side plates extending longitudinally throughout the frame, all of said parts being united to thereby form a unitary engine cylinder block and frame.

6. In a fabricated cylinder block and frame for an engine of opposed piston type characterized by upper and lower crankshafts, horizontally spaced pairs of frame bars extending vertically throughout a major part of the vertical extent of the block, upper and lower crankshaft bearing elements, means including laterally directed vertical plates, structurally connecting the bearing elements respectively, to the upper and lower ends of each pair of said bars, a plurality of deck plate assemblies extending longitudinally of the block and laterally thereof throughout the width of the block, said deck plate assemblies being adapted for receiving said frame bars in interfitting engagement therewith, spacer elements between said decks, provided for maintaining predetermined spacing of said decks vertically of the block, said decks having openings therein for the reception of cylinders, and side plates extending longitudinally throughout the length of the cylinder block, said side plates each being longitudinally slotted to receive the outer longitudinal edges of certain of said deck plate assemblies, all of said parts being united to thereby form a unitary cylinder block and frame.

7. In a fabricated cylinder block and frame for an engine of opposed piston type characterized by upper and lower crankshafts, a plurality of horizontally spaced, unitary frame plates extending vertically throughout a major part of the vertical extent of the block, a unitary vertically and laterally extending plate element engaging the upper end of each of said frame plates, a lower crankshaft bearing element engaging the lower end of each of said frame plates, an upper crankshaft bearing element engaging each of said plate elements, a plurality of unitary deck plates extending longitudinally and laterally of the cylinder block, each of said deck plates being provided with closed slots centrally thereof, to receive said vertical frame plates therethrough, and side plates extending longitudinally throughout the length of the block, all of said parts being united to thereby form a unitary cylinder block and frame.

8. In a fabricated cylinder block and frame for an engine of opposed piston type characterized by upper and lower crankshafts, a plurality of horizontally spaced, unitary frame plates extending vertically throughout a major part of the vertical extent of the block, the lower integral end portion of each being of a lateral extent corresponding substantially to the width of the block, a vertically arranged plate element extending substantially throughout the width of the block and engaging the upper end of each of said frame plates, an upper crankshaft bearing member carried by each of said plate elements, a lower crankshaft bearing member carried by said lower end portion of each frame plate, a plurality of unitary, horizontal deck plates extending longitudinally and laterally of the block, each having openings therein to receive cylinder liners therethrough, and side plates extending longitudinally throughout the length of the block, said side plates each being longitudinally apertured to receive longitudinal edge portions of certain of the deck plates, all of said parts being united to thereby form a unitary cylinder block and frame.

9. The subject matter of claim 8 wherein each of said unitary deck plates is provided with longitudinally spaced apertures to receive therethrough, said unitary, vertically extending frame plates, whereby to provide for an interlocking assembly of said plates.

JAMES W. OWENS.